United States Patent [19]
Gorden et al.

[11] Patent Number: 5,438,326
[45] Date of Patent: Aug. 1, 1995

[54] METHOD AND APPARATUS IN A RADIO PAGING SYSTEM FOR UPDATING PAGING STATISTICS FROM A PAGING BASE STATION

[75] Inventors: William Gorden, Chicago, Ill.; Robert L. Breeden, Boca Raton, Fla.

[73] Assignee: Motorola, Inc., Schaumburg, Ill.

[21] Appl. No.: 86,064

[22] Filed: Jul. 6, 1993

[51] Int. Cl.[6] .......................... H04J 3/26; G06F 15/76
[52] U.S. Cl. .......................... 340/825.44; 340/825.07; 379/113; 455/38.1; 455/53.1
[58] Field of Search .................. 340/825.44, 825.07; 379/58, 59, 60, 57, 111, 112, 113, 92; 455/2, 38.1, 53.1

[56] References Cited

U.S. PATENT DOCUMENTS

| | | | |
|---|---|---|---|
| 4,897,835 | 12/1987 | Gaskill et al. | 370/94.1 |
| 5,027,427 | 6/1991 | Shimizu | 455/67 |
| 5,065,393 | 11/1991 | Sibbitt et al. | 379/112 |
| 5,138,311 | 8/1992 | Weinberg | 340/825.03 |
| 5,231,593 | 7/1993 | Notess | 379/113 |
| 5,285,494 | 2/1994 | Sprecher et al. | 379/60 |

FOREIGN PATENT DOCUMENTS

0197556A2 10/1986 European Pat. Off. ....... H04H 3/00
0198448A1 10/1986 European Pat. Off. ....... H04B 7/24

*Primary Examiner*—Donald J. Yusko
*Assistant Examiner*—Edward Merz
*Attorney, Agent, or Firm*—R. Louis Breeden

[57] ABSTRACT

A method and apparatus update page transmission verification statistics maintained by a network management center (140) in a radio paging system (100) in which encoding of a page is performed by a paging base station lo (132) remote from a central paging controller (101). Verification information is selectively stored (510, 514) in the paging base station (132) when a page is transmitted (512) in response to paging data sent from the central paging controller (101). The verification information includes an identifier (408) associated with the page and a time report (409) for reporting time of transmission of the page. The stored verification information is transmitted (608) periodically from the paging base station (132) to the network management center (140), and then combined (818) in the network management center (140) with current page transmission verification statistics (212) maintained by the network management center (140), thereby updating the page transmission verification statistics (212).

20 Claims, 6 Drawing Sheets

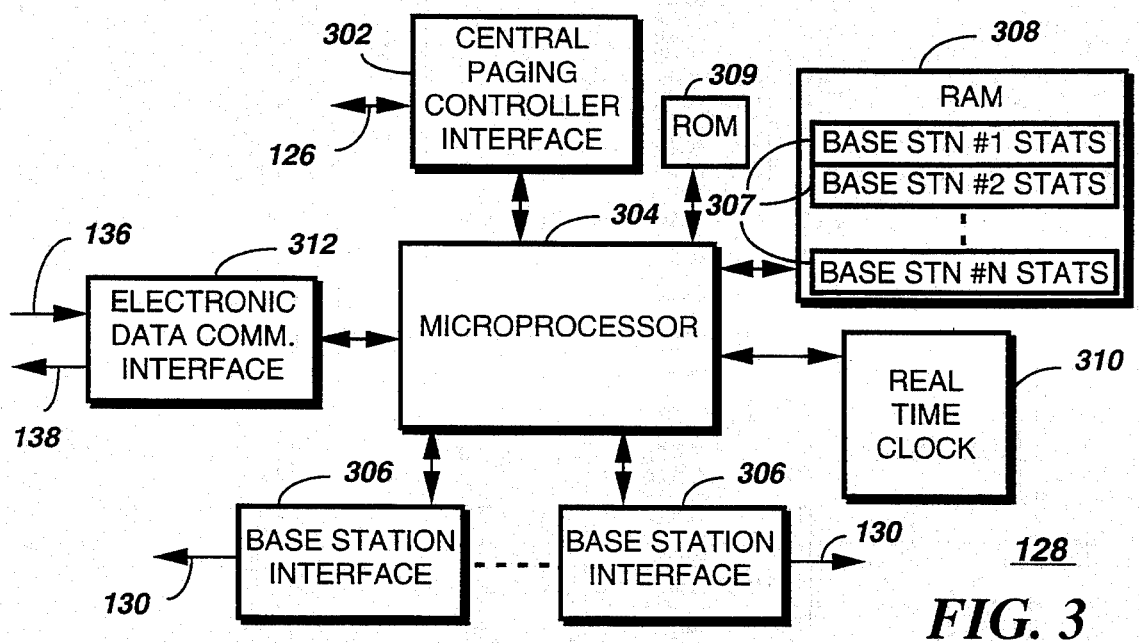
*FIG. 3*
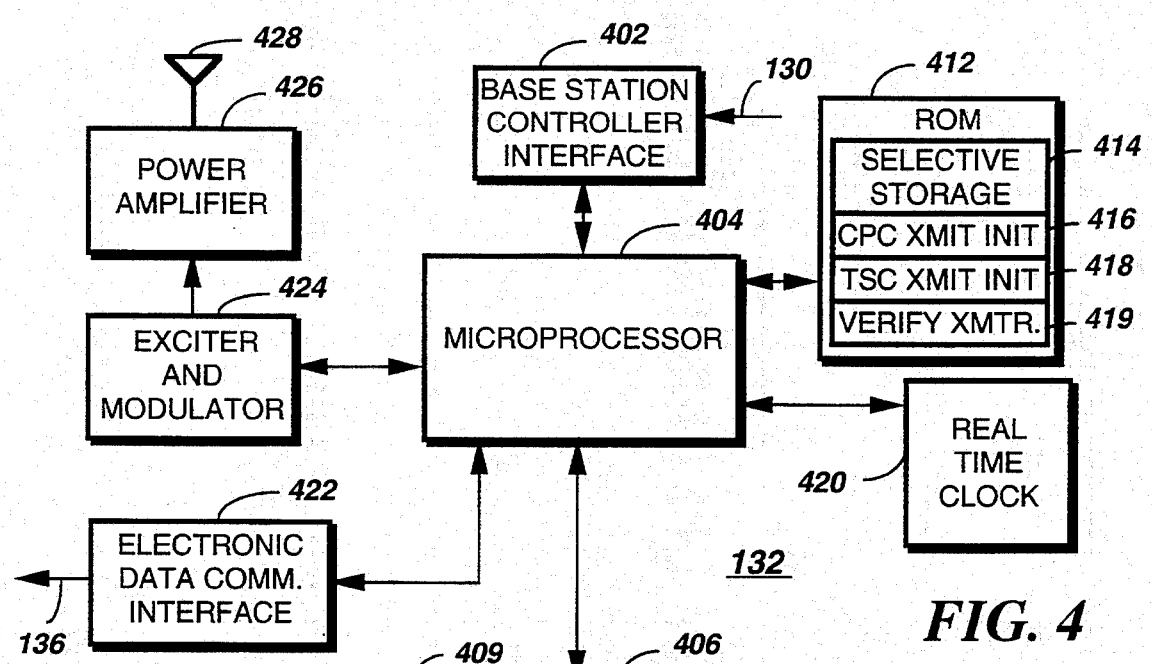
*FIG. 4*
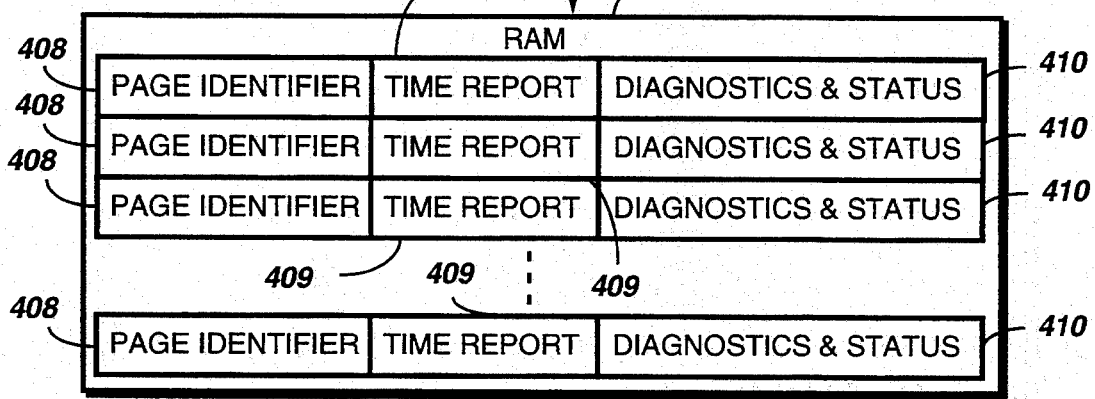

METHOD AND APPARATUS IN A RADIO PAGING SYSTEM FOR UPDATING PAGING STATISTICS FROM A PAGING BASE STATION

FIELD OF THE INVENTION

This invention relates in general to radio paging systems, and more specifically to a method and apparatus for updating paging transmission verification statistics from information stored at a base site.

BACKGROUND OF THE INVENTION

In a conventional radio paging system a central paging controller typically has performed queuing, dequeuing, and encoding of each page into a "batch" of pages. In such a system, page transmission verification statistics, e.g., page identification and time of transmission of the page or page batch, have been recorded by the central paging controller at the time the central paging controller encoded the page batch. This method of recording the verification statistics has proven reliable in the conventional paging system, because other components of the paging system, such as a transmitter system controller and radio transmitters, have not manipulated the page batch, except for transmitting the page batch as received from the central paging controller.

Next generation, high data rate radio paging systems will relocate the queuing, dequeuing, and encoding of each page batch away from the central paging controller and into the transmitter system controller and base stations. Such remote manipulation of paging data introduces delay and transmission uncertainty, thereby rendering it no longer possible to rely upon the time of transmission of paging data from the central paging controller for recording the page transmission verification statistics. Still, it is highly desirable to be able to maintain such statistics accurately at a central location, such as a network management center, for later retrieval in verifying paging system performance.

Thus, what is needed is a way of reliably obtaining page transmission verification statistics at a central location. Preferably, the statistics will be based upon the actual time of transmission of the page or page batch from the base stations. It is also highly desirable for the verification statistics to be capable of including diagnostic and status information pertaining to base site equipment for verifying functionality of the base site equipment at the time of transmission of a page or page batch.

SUMMARY OF THE INVENTION

One aspect of the present invention is a method of updating page transmission verification statistics maintained by a network management center in a radio paging system in which encoding of a page is performed by a paging base station remote from a central paging controller. The method comprises the step of selectively storing verification information in the paging base station when a page is transmitted in response to paging data sent from the central paging controller. The verification information comprises an identifier associated with the page and a time report for reporting time of transmission of the page. The verification information further comprises diagnostic and status information pertaining to base site equipment for verifying functionality of the base site equipment at the time of transmission of the page. The method further comprises transmitting periodically the verification information stored in the storing step from the paging base station to the network management center, and combining the verification information transmitted in the transmitting step with current page transmission verification statistics maintained by the network management center, thereby updating the page transmission verification statistics maintained by the network management center.

Another aspect of the present invention is an apparatus for updating page transmission verification statistics maintained by a network management center in a radio paging system in which encoding of a page is performed by a paging base station remote from a central paging controller. The apparatus comprises a selective storage element in the paging base station for selectively storing verification information when a page is transmitted in response to paging data sent from the central paging controller. The verification information comprises an identifier associated with the page and a time report for reporting time of transmission of the page. The verification information further comprises diagnostic and status information pertaining to base site equipment for verifying functionality of the base site equipment at the time of transmission of the page. The apparatus further comprises a verification transmitter in the paging base station for transmitting periodically the verification information stored by the selective storage element from the paging base station to the network management center. The apparatus further comprises an update element in the network management center for combining the verification information transmitted by the verification transmitter with current page transmission verification statistics maintained by the network management center, thereby updating the page transmission verification statistics maintained by the network management center.

BRIEF DESCRIPTION OF THE DRAWINGS

FIG. 3 is an electrical block diagram of a transmitter system controller in accordance with the preferred embodiment of the present invention.

FIG. 4 is an electrical block diagram of a paging base station in accordance with the preferred embodiment of the present invention.

DESCRIPTION OF THE PREFERRED EMBODIMENT

Figure 1:
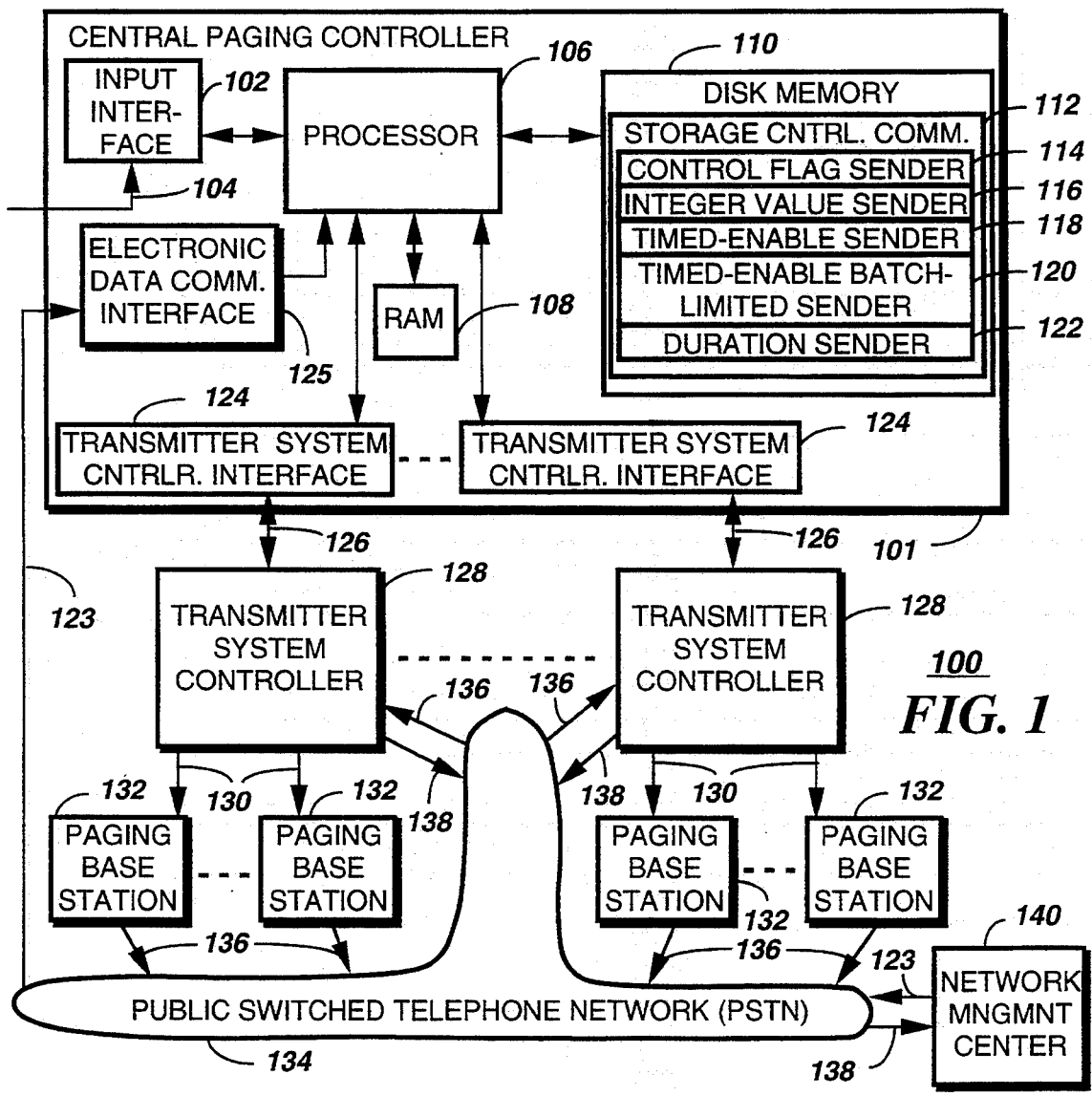
FIG. 1 is an electrical block diagram Of a radio paging system in accordance with the preferred embodiment of the present invention.

Referring to FIG. 1, an electrical block diagram of a radio paging system 100 in accordance with the preferred embodiment of the present invention comprises a central paging controller 101, coupled to a plurality of transmitter system controllers 128 for control thereof, each of which is coupled to a plurality of paging base stations 132 for control thereof. The central paging controller 101 preferably is similar to the MPS 2000™ Modular Paging Switch manufactured by Motorola, Inc. of Schaumburg, Illinois. The transmitter system controller 128 is preferably similar to the NCC-CIU/NCX Network Control Unit manufactured by Complex Systems, Inc. of Schaumburg, Illinois. The paging base station 132 preferably is similar to the T5482 Paging Base Station manufactured by Motorola, Inc. of Schaumburg Illinois. It will be appreciated that other comparable equipment can be used as well for the central paging controller 101, the transmitter system controller 128, and the paging base station 132.

The central paging controller 101 comprises a conventional input interface 102 for receiving page inputs from callers over a plurality of telephone lines 104. The input interface 102 is coupled to a processor 106 for controlling operation of the central paging controller 101. The processor 106 is coupled to a random access memory (RAM) 108 for temporary storage of operational data and coupled to a disk memory 110 for storage of system operating software elements. The software elements comprise a storage control communication element 112 for communicating storage control information from the central paging controller 101 to the paging base station 132 through the transmitter system controller 128. The storage control communication element 112 comprises a control flag sender element 114 for sending a control flag along with the paging data from the central paging controller 101 to the paging base station 132, the control flag having a binary value of 1 or 0, the 1 value for requesting that the verification information be stored for the paging data, and the 0 value for requesting that the verification information not be stored for the paging data.

The storage control communication element 112 further comprises an integer value sender element 116 for sending an integer value N from the central paging controller 101 to the paging base station 132, the integer value N for requesting that the verification information be stored for every Nth transmission of a batch of paging data. The storage control communication element 112 also comprises a timed enable sender element 118 for sending a first time value T1 from the central paging controller 101 to the paging base station 132, the first time value T1 for requesting that storage of the verification information be periodically enabled every T1 time units for a predetermined duration. The storage control communication element 112 also includes a timed-enable batch-limited sender element 120 for sending a second time value T2 and a batch count B from the central paging controller 101 to the paging base station 132, the second time value T2 and the batch count B for requesting that storage of the verification information be periodically enabled every T2 time units for a duration of B page batches. The storage control communication element 112 further includes a duration sender element 122 for sending a third time value T3 from the central paging controller 101 to the paging base station 132, the third time value T3 for requesting that storage of the verification information be enabled once for a duration of T3 time units.

The processor 106 is also coupled to a plurality of transmitter system controller interfaces 124 for communicating with the plurality of transmitter system controllers 128 over a plurality of two-way communication links 126. Each two-way communication link 126 preferably is a dedicated telephone circuit capable of operation at 2400 baud or higher, compatible with data traffic requirements of the transmitter system controller 128. Preferably, the communications protocol used on the two-way communication link 126 is the Telocator Network Paging protocol (TNPP), which is well known to one of ordinary skill in the art of paging infrastructure. It will be appreciated that other types of communication media, e.g., a radio link or a public switched data network link, may be used as well for the two-way communication link 126. It will be further appreciated that other types of communication protocols, such as the well-known HDLC protocol, may be used as well.

In addition, the processor 106 is coupled to an electronic data communication interface 125 for receiving data communications from a network management center 140 (FIG. 2) over a data communication link 123. Preferably, the data communication link 123 is coupled to the network management center 140 by a public switched telephone network (PSTN) 134. Preferably, the communications protocol on the data communication link 123 is similar to the HDLC protocol, modified for use on both one-way and two-way links. It will be appreciated that other types of communication media can be used as well for the data communication link 123, such as a radio communication link, a telephone network, a dedicated telephone line, or a fiber optic communication link. It will be further appreciated that other types of communication protocol, such as the well-known TCP/IP protocol, may be used as well on the data communication link 123.

Each transmitter system controller 128 is coupled to the paging base station 132 by a communication link 130. Preferably, the communication link 130 is a satellite radio link. Preferably, the communication link 130 utilizes a protocol similar to the HDLC protocol, modified for use in both one-way and two-way communication links. It will be appreciated that other types of data communication media, e.g., a terrestrial radio link, a telephone line, or a PSDN link, can be used as well for the communication link 130. It will be further appreciated that other similar communication protocols capable of one-way operation can be used as well on the communication link 130.

Each paging base station 132 is also coupled, preferably by the PSTN 134, to the transmitter system controller 128 by a data communication link 136 for sending page verification statistics to the transmitter system controller 128. The communication protocol used on the data communication link 136 is preferably similar to the HDLC protocol, modified for use in both one-way and two-way communication links. Each transmitter system controller 128 is further coupled, preferably by the PSTN 134, to a network management center 140 by a data communication link 138 for sending page verification statistics from the transmitter system controller 128 to the network management center 140. It will be appreciated that other types of data communication media, e.g., a radio link, a telephone line, or a telephone network link, can be used as well for the data communication links 136 and 138. It will be further appreciated that other similar communication protocols capable of one-way and two-way operation can be used as well on the data communication links 136 and 138.

Figure 2:
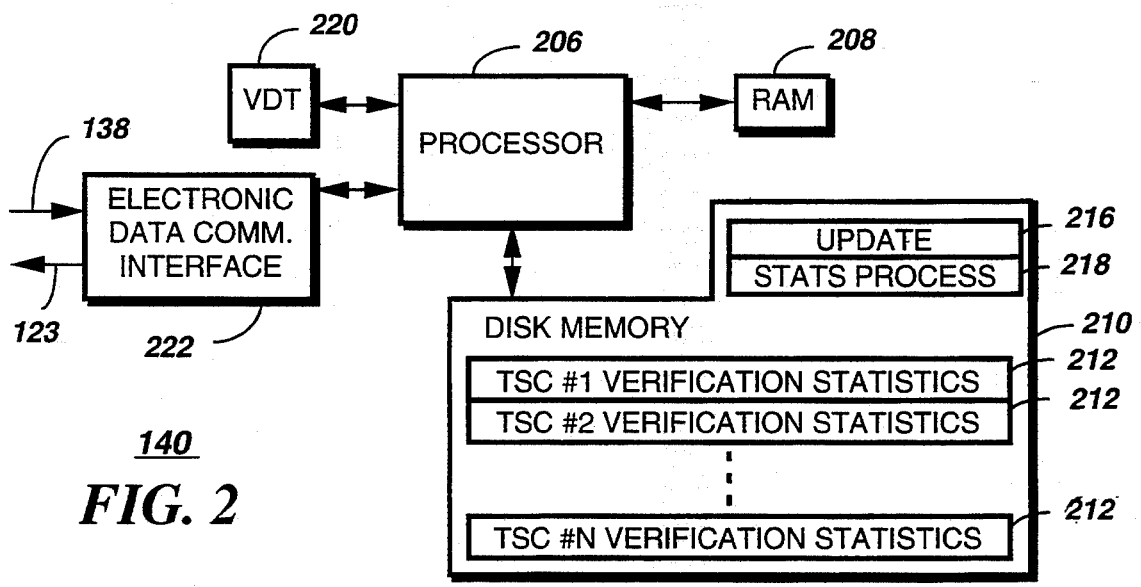
FIG. 2 is an electrical block diagram of a network management center in accordance with the preferred embodiment of the present invention.

Referring to FIG. 2, an electrical block diagram of the network management center 140 in accordance with the preferred embodiment of the present invention comprises a processor 206 coupled to a RAM 208 for temporarily storing operating variables. The processor 206 is further coupled to a disk memory 210 for storing software elements for controlling operation of the network management center 140. The software elements comprise an update element 216 for combining page verification statistics 212 received periodically from each transmitter system controller 128 by the network management center 140 with current page verification statistics 212 stored in the network management center 140, thereby reliably updating the page verification statistics 212. The software elements further comprise a statistics processing element 218 for consolidation of the page verification statistics 212 in response to operator commands. The disk memory 210 is further utilized for storing the page verification statistics 212. It will be appreciated that other types of memory, e.g., battery-backed-up RAM, magnetic tape, or optical storage systems, can be substituted as well for the disk memory 210. Preferably, the network management center is similar to a Macintosh Centris 650 personal computer, manufactured by Apple Computer Corporation of Cupertino, California. Other types of comparable computer systems may be used as well for the network management center 140.

The processor 206 is also coupled to a video display terminal (VDT) 220 for interfacing with a human operator. The processor 206 is further coupled to an electronic data communication interface 222, which is coupled to the data communication link 138 for receiving the page verification statistics 212 from the transmitter system controller 128. The electronic data communication interface 222 is further coupled to the data communication link 123 for sending data communications, e.g., network operator commands, to the central paging controller 101.

Referring to FIG. 3, an electrical block diagram of the transmitter system controller 128 in accordance with the preferred embodiment of the present invention comprises a central paging controller interface 302 coupled to the two-way communication link 126 for communicating with the central paging controller 101. The central paging controller interface 302 is coupled to a microprocessor 304 for controlling operation of the transmitter system controller 128. The microprocessor 304 is coupled to a plurality of base station interfaces 306 for communicating with the plurality of paging base stations 132. Each base station interface 306 is coupled to the communication link 130 for providing a path for communications with the plurality of paging base stations 132.

The microprocessor 304 is further coupled to a RAM 308 for temporarily storing operational data. The RAM 308 comprises storage locations for storing base station page verification statistics 307 received periodically from the plurality of paging base stations 132. The microprocessor 304 is further coupled to a real time clock 310 for scheduling transmission times for paging batches. In addition, the microprocessor 304 is coupled to an electronic data communication interface 312 for sending and receiving page verification statistics. The electronic data communication interface 312 is coupled to the data communication links 136 and 138 for communicating with the paging base station 132 and the network management center 140, respectively.

Referring to FIG. 4, an electrical block diagram of the paging base station 132 in accordance with the preferred embodiment of the present invention comprises a base station controller interface 402 coupled to the communication link 130 for receiving paging data from the transmitter system controller 128. The base station controller interface 402 is coupled to a microprocessor 404 for controlling operation of the paging base station 132. The microprocessor 404 is coupled to a RAM 406 for temporarily storing operating variables. The RAM 406 includes storage locations for storing page verification statistics, comprising a page identifier 408 and a time report 409, along with diagnostics and status information 410.

The microprocessor 404 is further coupled to a ROM 412 for storing operating system software, including a selective storage element 414 for selectively storing the page verification statistics when a page is transmitted in response to paging data sent from the central paging controller. By selectively activating and deactivating storage of page verification statistics in response to storage control communications sent by the central paging controller 101, the microprocessor 404 advantageously can conserve storage locations in the RAM 406, thus minimizing the size and cost of the RAM 406.

The operating system software also includes a central paging controller transmission initiation element 416 for initiating a transmission of the page verification statistics in response to a request forwarded from the central paging controller 101. The operating system software further includes a transmitter system controller transmission initiation element 418 for initiating a transmission of the page verification statistics in response to a request forwarded from the transmitter system controller 128. In addition, the operating system software includes a verification transmitter element 419 in the paging base station 132 for transmitting periodically the page verification statistics stored in the RAM 406 by the selective storage element 414 from the paging base station 132 to the network management center 140.

The microprocessor 404 is also coupled to a real time clock 420 for initiating page transmission in accordance with a time designated by the transmitter system controller 128. The microprocessor 404 is further coupled to an electronic data communication interface 422 for periodically sending the page verification statistics to the transmitter system controller 128 by the data communication link 136. In addition, the microprocessor 404 is coupled to an exciter and modulator 424 for generating and modulating a radio frequency (RF) signal comprising radio pages. The exciter and modulator 424 is coupled to a power amplifier 426 and antenna 428 for amplifying the radio pages and transmitting the amplified radio pages to selective call receivers.

Figure 5:
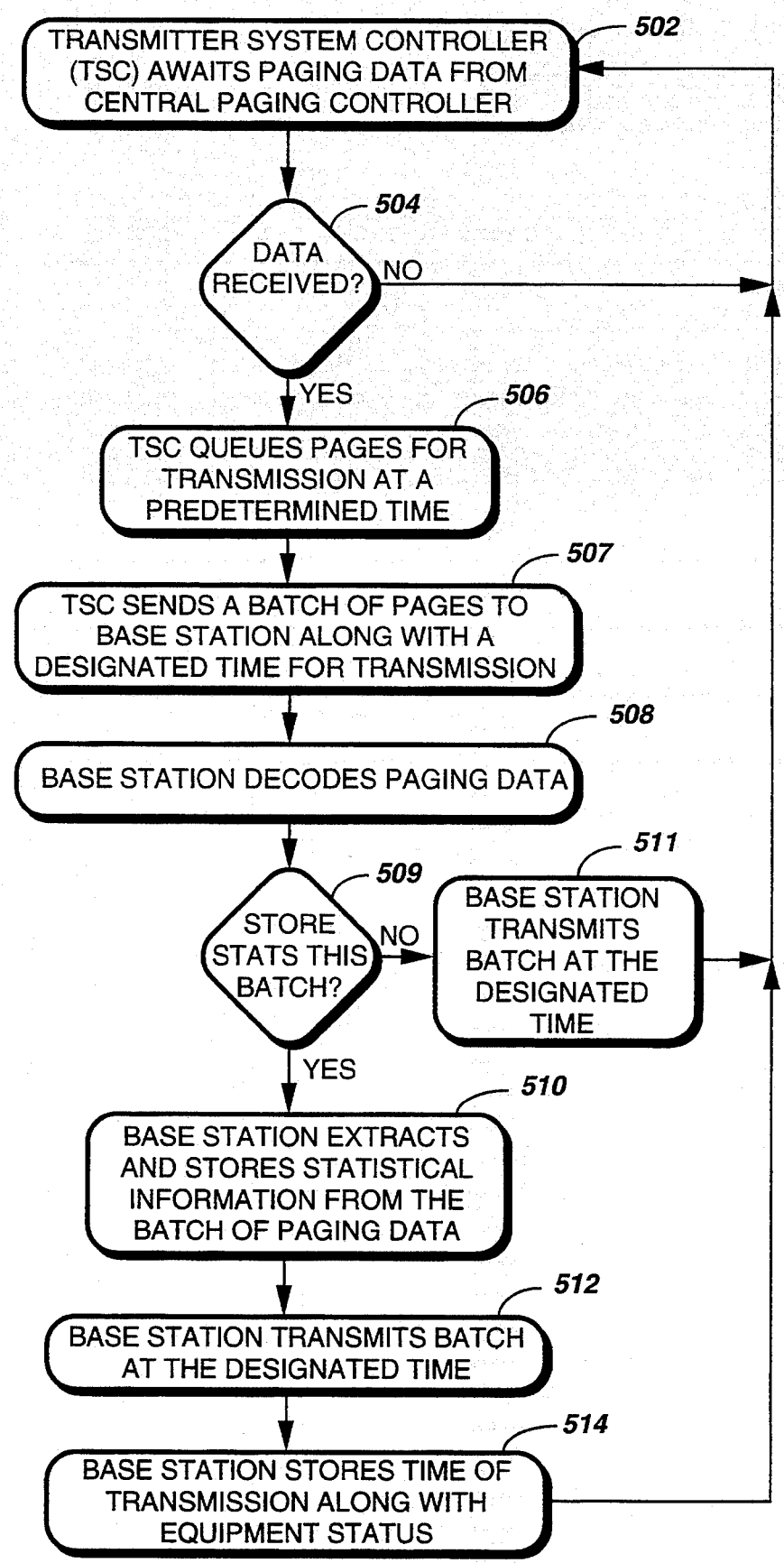
FIG. 5 is a flow chart depicting operation of the paging base station and transmitter system controller during paging in accordance with the preferred embodiment of the present invention.

Referring to FIG. 5, a flow chart depicting operation of the paging base station 132 and transmitter system controller 128 during paging in accordance with the preferred embodiment of the present invention begins with the microprocessor 304 of the transmitter system controller 128 waiting 502 for paging data from the central paging controller 101. In seep 504 if no data has been received, flow returns to step 502 to continue waiting. On the other hand, if in step 504 a batch of paging data has been received, then the microprocessor 304 begins 506 conventional queuing of the batch of paging data for transmission at a predetermined time. In step 507 the microprocessor 304 transmits the queued batch of paging data to the paging base station 132, along with a designated time for transmission.

Next, the microprocessor 404 of the paging base station 132 decodes 508 the batch of paging data received and determines 509 from a storage control flag 904 (FIG. 9) in the batch and from additional storage control information 1002, 1004, 1006 (FIG. 10) sent earlier from the central paging controller 101 whether or not to store page verification statistics for the current batch of pages. If not, the microprocessor 404 controls the paging base station 132 to transmit 511 the batch of pages at the designated time. If, on the other hand, in step 509 the microprocessor 404 determines that the statistics are to be stored, then the microprocessor 404 extracts 510 from the batch and stores statistical information, such as the page identifier 408, derived, for example, from a batch number 902 (FIG. 9) heading the batch of pages. At the designated time, as determined from the real-time clock 420, microprocessor 404 controls the paging base station 132 to transmit 512 the batch of pages. After transmission of the batch the microprocessor 404 stores 514 the exact time of transmission in the location of the RAM 406 for the time report 409 corresponding to the page identifier 408 stored in step 510, along with equipment status and diagnostic information, e.g., alarm conditions, at the time of transmission. Flow then returns to step 502 to await more paging data.

Figure 6:
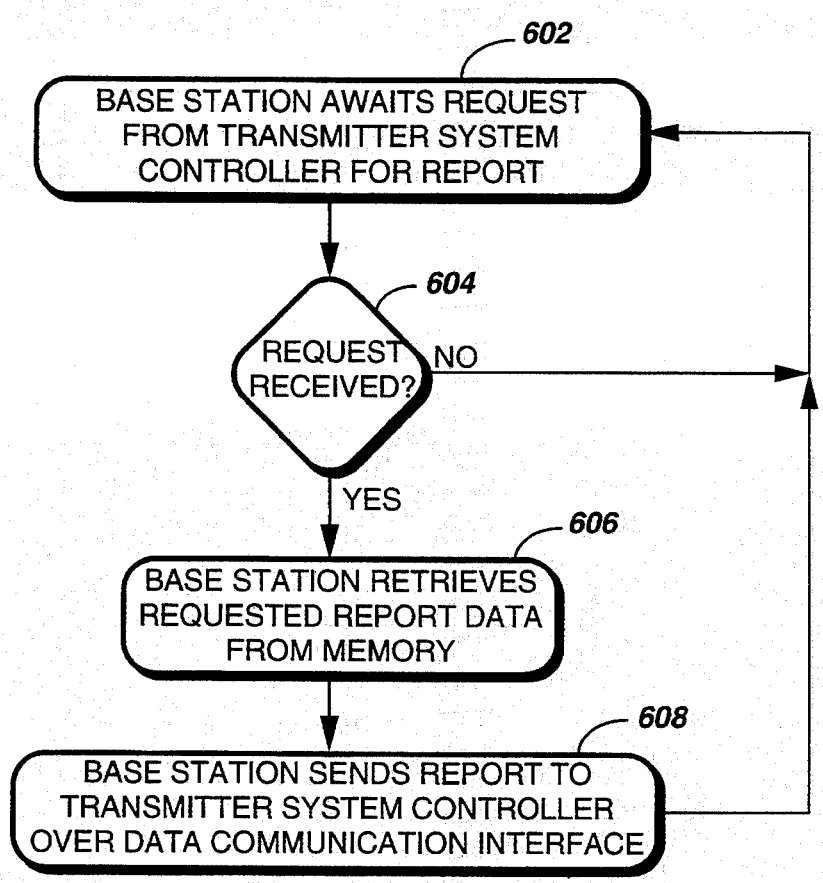
FIG. 6 is a flow chart depicting operation of the paging base station during reporting of page verification statistics by the paging base station in accordance with the preferred embodiment of the present invention.

Referring to FIG. 6, a flow chart depicting operation of the paging base station 132 during reporting of page verification statistics by the paging base station 132 in accordance with the preferred embodiment of the present invention begins with the microprocessor 404 of the paging base station 132 awaiting 602, 604 a report request from the transmitter system controller 128. When a request is received in step 604, the microprocessor 404 retrieves 606 the requested report data from the RAM 406. Then the microprocessor 404 formats the report data and sends 608 the report data through the electronic data communication interface 422 and the data communication link 136 to the transmitter system controller 128. Flow then returns to step 602 to await another report request.

Figure 7:
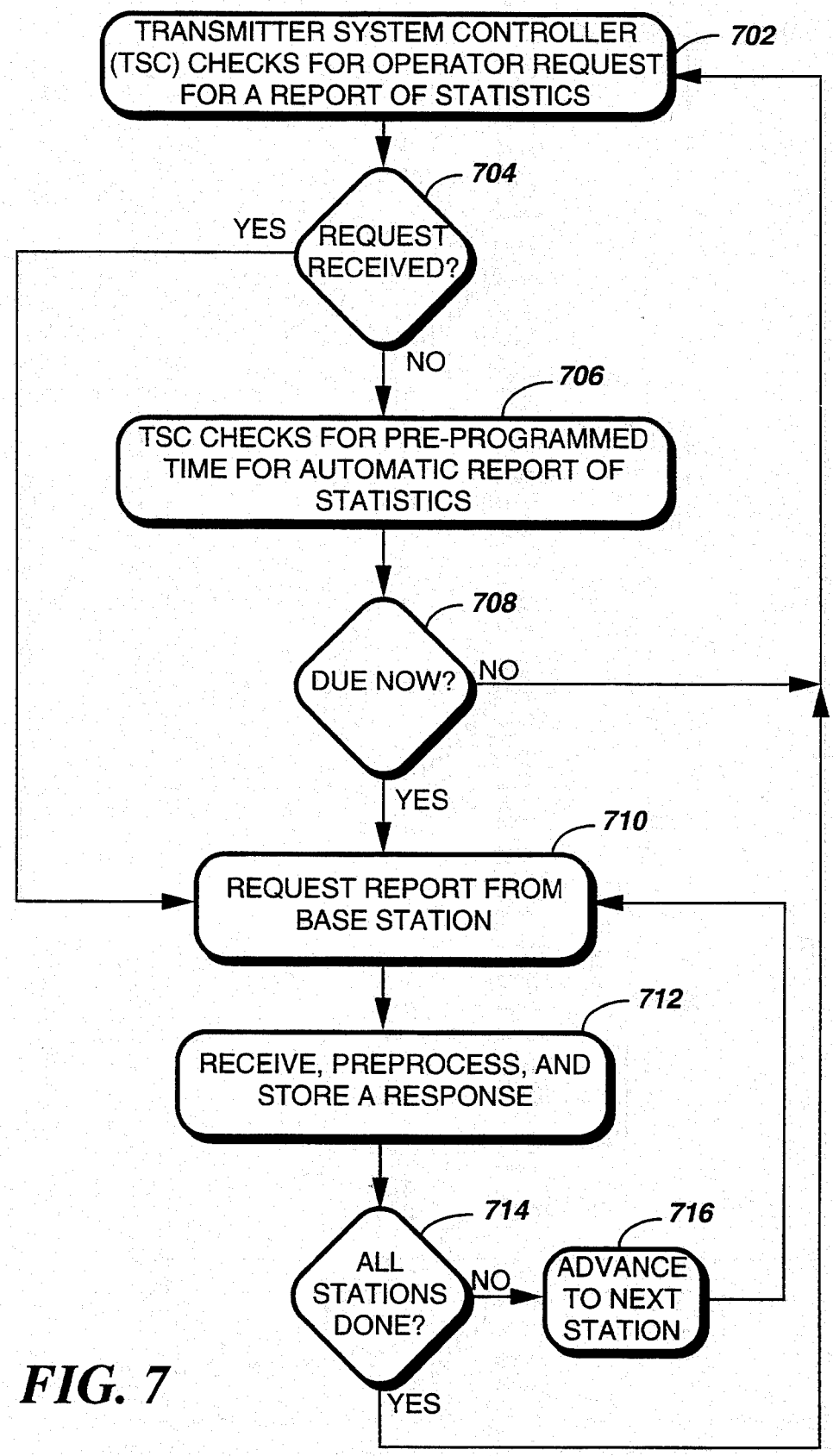
FIG. 7 is a flow chart depicting operation of the transmitter system controller during reporting of page verification statistics from the paging base station in accordance with the preferred embodiment of the present invention.

Referring to FIG. 7, a flow chart depicting operation of the transmitter system controller 128 during reporting of page verification statistics from the paging base station 132 in accordance with the preferred embodiment of the present invention begins with the microprocessor 304 of the transmitter system controller 128 checking 702 incoming data from the central paging controller 101 for an operator request for a report of statistics. Preferably, the operator request originates from the network management center 140, and is forwarded through the central paging controller 101 by the data communication link 123 for transmission to the transmitter system controller 128.

If in step 704 an operator request has been received, flow jumps to step 710, during which the microprocessor 304 sends a report request to a first paging base station 132. A response is received from the first paging base station 132 at step 712, during which the microprocessor 304 processes the response and stores the response in a location for the base station page verification statistics 307 corresponding to the first paging base station 132. Then the microprocessor 304 checks 714 to determine if all the paging base stations 132 serving the transmitter system controller 128 have reported. If not, the microprocessor 304 advances 716 to a next paging base station 132, and flow returns to step 710 to request a report from a next paging base station 132. If, on the other hand, in step 714 all the paging base stations 132 have reported, then the flow returns to step 702 to check for an operator request for a report.

If in step 704 an operator request has not been received, the microprocessor 304 of the transmitter system controller 128 checks 706 whether a pre-programmed time for automatic reports of statistics has arrived. If not, flow returns from step 708 to step 702 to check for an operator request for a report. If in step 708 an automatic report is due now, then flow proceeds to step 710 to request a report from a paging base station 132, as described herein above.

By collecting page verification statistics directly from the paging base stations 132, the radio paging system 100 advantageously obtains statistics that accurately reflect actual paging activity. Unlike conventional radio paging systems, which assume that a page will be transmitted once the page leaves the central paging controller, the radio paging system 100 does not count a page as sent until confirmed by the paging base station 132.

Figure 8:
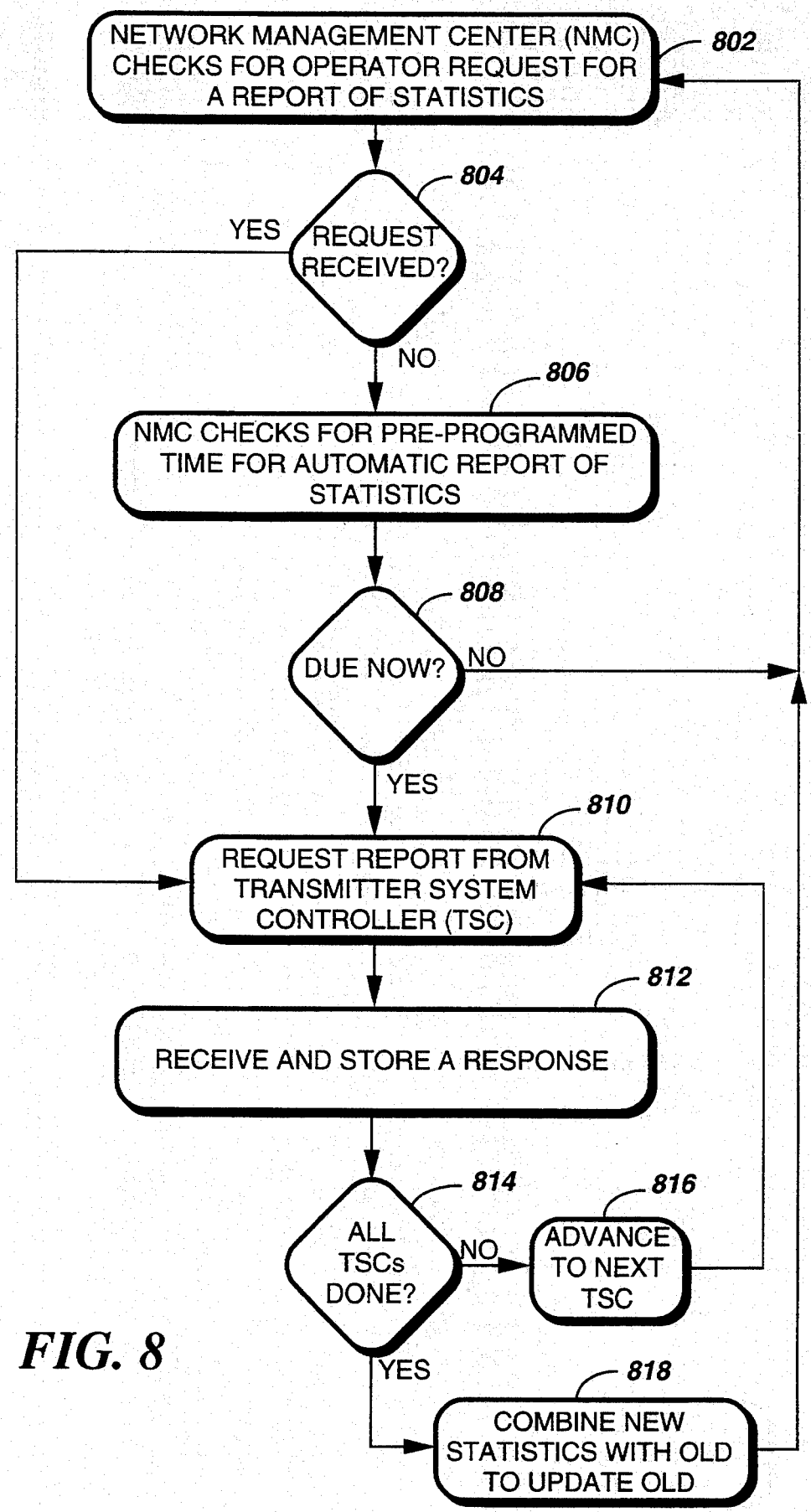
FIG. 8 is a flow chart depicting operation of the network management center during uploading of page verification statistics from the transmitter system controller in accordance with the preferred embodiment of the present invention.

Referring to FIG. 8, a flow chart depicting operation of the network management center 140 during uploading of page verification statistics from the transmitter system controller 128 in accordance with the preferred embodiment of the present invention begins with the processor 206 of the network management center 140 checking 802 for an operator request for a report of statistics. Preferably, the operator request originates from the VDT 220 of the network management center 140.

If in step 804 an operator request has been received, flow jumps to step 810, during which the processor 206 sends a report request to a first transmitter system controller 128. A response is received from the first transmitter system controller 128 at step 812, during which the processor 206 checks 814 to determine if all the transmitter system controllers 128 serving the network management center 140 have reported. If not, the processor 206 advances 816 to a next transmitter system controller 128, and flow returns to step 810 to request a report from a next transmitter system controller 128. If, on the other hand, in step 814 all the transmitter system controllers 128 have reported, then the processor 206 combines 818 the newly received statistics with the page verification statistics 212 stored previously by the processor 206, thereby updating the page verification statistics 212, after which the flow returns to step 802 to check for an operator request for a report.

If in step 804 an operator request has not been received, the processor 206 of the network management center 140 checks 806 whether a pre-programmed time for automatic reports of statistics has arrived. If not, flow returns from step 808 to step 802 to check for an operator request for a report. If in step 808 an automatic report is due now, then flow proceeds to step 810 to request a report from a transmitter system controller 128, as described herein above.

Figure 9:
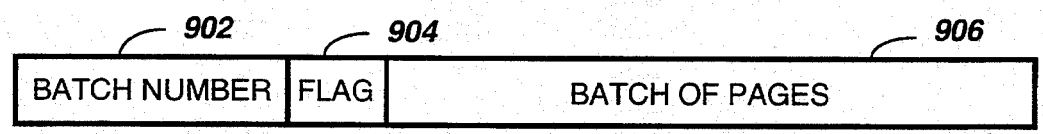
FIG. 9 is a data communications structure diagram depicting the structure of paging and storage control communications from the central paging controller in accordance with the preferred embodiment of the present invention.

Referring to FIG. 9, a data communications structure diagram 900 depicts the structure of paging and storage control communications from the central paging controller 101 in accordance with the preferred embodiment of the present invention. The diagram 900 shows that a batch of pages is headed by the batch number 902, which uniquely identifies the batch. The diagram 900 also shows the storage control flag 904, used for indicating whether or not the page verification statistics should be stored for the batch. In addition, the diagram 900 shows the batch of paging data 906, which follows the storage control flag 904. Preferably, whenever the storage control flag 904 indicates that the page verification statistics should be stored for the batch, then the page verification statistics always will be stored for the batch, whether or not additional storage control communications as described below call for storage.

Figure 10:
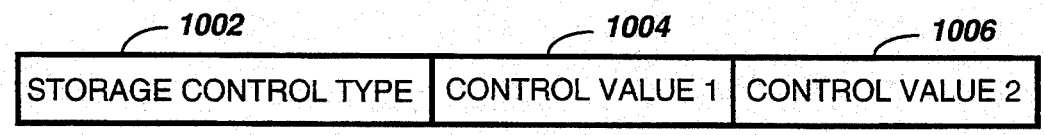
FIG. 10 is a data communications structure diagram depicting the structure of additional storage control communications from the central paging controller in accordance with the preferred embodiment of the present invention.

Referring to FIG. 10, a data communications structure diagram 1000 depicts the structure of additional storage control communications from the central paging controller 101 in accordance with the preferred embodiment of the present invention. The diagram 1000 shows that the additional storage control communications comprise a storage control type element 1002, and first and second control values 1004, 1006. The storage control type element 1002 indicates the type of storage control and thus determines the meaning of the first and second control values 1004, 1006. The following table provides examples of the use of the storage control type element 1002 and the first and second control values 1004, 1006.

| Storage Control Type Element 1002 | Meaning of First Ctrl Value 1004 | Meaning of Secnd Ctrl Value 1006 |
| --- | --- | --- |
| 1 | N | (Not Used) |
| 2 | T1 | (Not Used) |
| 3 | T2 | B |
| 4 | T3 | (Not Used) |

In the preceding table, a storage control type element 1002 value of one means the first control value 1004 is an integer N indicating that the page verification statistics are to be stored for every Nth batch of pages. Alternatively, a storage control type element 1002 value of two means the first control value 1004 is a first time value T1 for requesting that storage of the page verification statistics be enabled every T1 minutes for a predetermined duration. On the other hand, a storage control type element 1002 value of three means the first control value 1004 is a second time value T2, and the second control value 1006 is a batch count B, for requesting that storage of the page verification statistics be enabled every T2 minutes for a duration of B batches. As a final example, a storage control type element 1002 value of four means the first control value 1004 is a third time value T3, for requesting that storage of the page verification statistics be enabled once for a duration of T3 minutes. The flexible control of storage of the page verification statistics provided by the storage control communications in accordance with the present invention minimizes memory requirements in the paging base station 132, while still providing statistically meaningful page verification data.

Preferably, whenever the additional storage control communications indicate that the page verification statistics should be stored over an interval, then the page verification statistics will be stored over the interval, even if the storage control flag 904 indicates that the page verification statistics are not required to be stored for a particular batch sent within the interval. It will be appreciated that additional storage control type element 1002 values along with corresponding alternative methods of storage control can be added by one of ordinary skill in the art without departing from the intent of the present invention.

Thus, the present invention advantageously provides a way of reliably obtaining page transmission verification statistics at a central location. The statistics are based upon the actual time of transmission of the page or page batch from the paging base stations 132. The verification statistics also can include diagnostic and status information pertaining to base site equipment for verifying functionality of the base site equipment at the time of transmission of a page or page batch. Flexible storage control is provided for reducing memory requirements and for reducing the amount of data that must be communicated from the paging base station 132 to the network management center 140. Furthermore, by transmitting the statistics first from the paging base station 132 to the transmitter system controller 128 and thence to the network management center 140, the statistics can be preprocessed by the transmitter system controller 128, thus advantageously further reducing the amount of data required to be sent to the network management center 140 for processing.

What is claimed is:

1. A method of updating page transmission verification statistics maintained at a network management center in a radio paging system in which encoding of a page is performed by a paging base station remote from a central paging controller, the method comprising the steps of:

selectively storing verification information in the paging base station when a page is transmitted in response to paging data sent from the central paging controller, the verification information comprising:

an identifier associated with the page;

a time report for reporting time of transmission of the page; and diagnostic and status information pertaining to base site equipment for verifying functionality of the base site equipment at the time of transmission of the page, wherein the method further comprises:

transmitting periodically the verification information stored in said storing step from the paging base station to the network management center; and combining the verification information transmitted in said transmitting step with current page transmission verification statistics maintained by the network management center, thereby updating the page transmission verification statistics maintained by the network management center.

2. The method according to claim 1, wherein said transmitting step is initiated in response to a request forwarded from the central paging controller.

3. The method according to claim 1, wherein the radio paging system includes a transmitter system controller coupled between the central paging controller and the paging base station, and wherein said transmitting step is initiated in response to a request forwarded from the transmitter system controller.

4. The method according to claim 1, wherein said transmitting step comprises the step of sending the verification information over an electronic data communication medium.

5. The method according to claim 1, further comprising the step of communicating storage control information from the central paging controller to the paging base station, wherein said storing step is activated and deactivated in accordance with the storage control information.

6. The method according to claim 5, wherein said communicating step comprises the step of sending a control flag along with the paging data from the central paging controller to the paging base station, the control flag having a value selected from first and second values, the first value for requesting that the verification information be stored for the paging data, and the second value for requesting that the verification information not be stored for the paging data.

7. The method according to claim 5, wherein said communicating step comprises the step of sending an integer value N from the central paging controller to the paging base station, the integer value N for requesting that the verification information be stored for every Nth transmission of paging data.

8. The method according to claim 5, wherein said communicating step comprises the step of sending a first time value T1 from the central paging controller to the paging base station, the first time value T1 for requesting that storage of the verification information be periodically enabled every T1 time units for a predetermined duration.

9. The method according to claim 5, wherein said communicating step comprises the step of sending a second time value T2 and a batch count B from the central paging controller to the paging base station, the second time value T2 and the batch count B for requesting that storage of the verification information be periodically enabled every T2 time units for a duration of B page batches.

10. The method according to claim 5, wherein said communicating step comprises the step of sending a third time value T3 from the central paging controller to the paging base station, the third time value T3 for requesting that storage of the verification information be enabled once for a duration of T3 time units.

11. An apparatus for updating page transmission verification statistics maintained by a network management center in a radio paging system in which encoding of a page is performed by a paging base station remote from a central paging controller, the apparatus comprising:
a selective storage element in the paging base station for selectively storing verification information when a page is transmitted in response to paging data sent from the central paging controller, the verification information comprising:
an identifier associated with the page;
a time report for reporting time of transmission of the page; and
diagnostic and status information pertaining to base site equipment for verifying functionality of the base site equipment at the time of transmission of the page,
wherein the apparatus further comprises:
a verification transmitter element in the paging base station for transmitting periodically the verification information stored by said selective storage element from the paging base station to the network management center; and
an update element in the network management center for combining the verification information transmitted by said verification transmitter with current page transmission verification statistics maintained by the network management center, thereby updating the page transmission verification statistics maintained by the network management center.

12. The apparatus according to claim 11, further comprising a first transmission initiation element in the paging base station for initiating a transmission of the verification information in response to a request forwarded from the central paging controller.

13. The apparatus according to claim 11,
wherein the radio paging system comprises a transmitter system controller coupled between the central paging controller and the paging base station, and
wherein the apparatus further comprises a second transmission initiation element in the paging base station for initiating a transmission of the verification information in response to a request forwarded from the transmitter system controller.

14. The apparatus according to claim 11, further comprising an electronic data communication interface element in the paging base station for sending the verification information over an electronic data communication medium.

15. The apparatus according no claim 11, further comprising a storage control communication element in the central paging controller for communicating storage control information from the central paging controller to the paging base station, wherein said selective storage element is activated and deactivated in accordance with the storage control information.

16. The apparatus according to claim 15, wherein said storage control communication element comprises a control flag sender element for sending a control flag along with the paging data from the central paging controller to the paging base station, the control flag having a value selected from first and second values, the first value for requesting that the verification information be stored for the paging data, and the second value for requesting that the verification information not be stored for the paging data.

17. The apparatus according to claim 15, wherein said storage control communication element comprises an integer value sender element for sending an integer value N from the central paging controller to the paging base station, the integer value N for requesting that the verification information be stored for every Nth transmission of paging data.

18. The apparatus according to claim 15, wherein said storage control communication element comprises a timed-enable sender element for sending a first time value T1 from the central paging controller to the paging base station, the first time value T1 for requesting that storage of the verification information be periodically enabled every T1 time units for a predetermined duration.

19. The apparatus according to claim 15, wherein said storage control communication element comprises a timed-enable batch-limited sender element for sending a second time value T2 and a batch count B from the central paging controller to the paging base station, the second time value T2 and the batch count B for requesting that storage of the verification information be periodically enabled every T2 time units for a duration of B page batches.

20. The apparatus according to claim 15, wherein said storage control communication element comprises a duration sender element for sending a third time value T3 from the central paging controller to the paging base station, the third time value T3 for requesting that storage of the verification information be enabled once for a duration of T3 time units.

* * * * *